Sept. 10, 1940.  H. MAYR  2,214,106

MOTOR DRIVE FOR CYCLES

Filed Feb. 23, 1938

Patented Sept. 10, 1940

2,214,106

UNITED STATES PATENT OFFICE 2,214,106

MOTOR DRIVE FOR CYCLES

Hermann Mayr, Hildburghausen, Germany

Application February 23, 1938, Serial No. 192,057
In Germany February 25, 1937

1 Claim. (Cl. 74—190)

In developing all known motor drives for cycles the greatest possible simplification was always the main factor. This simplification applied not only to the design of the engine and to the power transmission means. It has been carried so far that a wheel driven directly by the crank shaft of the engine has been simply placed on the front or rear wheel of the cycle and transmits the rotary movement from the engine directly to the cycle without any stepped gear or clutch. This farthest reaching simplification of the drive has a very favourable effect in many respects. Thus, the price of the prime mover is very low, all difficulties of accommodating the power transmitting means are avoided, the weight of the drive is considerably reduced and finally the attendance is much simplified. However, in carefully examining these known motor drives for cycles in practical service it has been found that the advantages resulting from the presence of a change speed gear and a clutch cannot be dispensed within a motor cycle drive if the running of such a vehicle is to be a pleasure for the user. When riding in undulating and hilly country it is essential to have a variable ratio in the transmission of the rotary movement, furthermore it is sometimes necessary to disconnect the driving engine from the wheels of the cycle especially if one desires or is compelled to drive the cycle by means of the pedals. Moreover it must be possible for the engine to run idle, for example in the case of rapid and sudden braking, if the necessity of re-starting the stopped engine every time is to be avoided.

This problem is solved according to the invention without clutches and change gears usually provided on motor vehicles, in that the whole of the prime mover is oscillatably mounted on the vehicle frame in such a manner that the distance between the axis of the driving wheel and the axis of the cycle wheel can be varied within predetermined limits. This is effected by means of an apparatus by which the prime mover or the driving wheel is moved more or less away from or pressed against the wheel. This apparatus is connected to a rack segment fixed on the handle bar or the frame of the cycle and by means of which the prime mover or the driving wheel is fixed in different positions relatively to the wheel.

If the engine is to run idle or to be stopped entirely and the cycle driven by the pedals, the prime mover is swung so far upwards that the wedge shaped profile of the driving wheel is lifted entirely from the cycle wheel. If a driving wheel is used the size or diameter of the running surface of which can be varied according to the distance between its axle and that of the driven cycle wheel the ratio of the power transmission and consequently the speed of the cycle can be changed gradually by swinging the prime mover more or less away from or pressing it onto the wheel. Such a driving wheel which may be constructed in very different types, will be hereinafter described.

An embodiment of the invention is illustrated by way of example in the accompanying drawing, in which.

Figure 1:
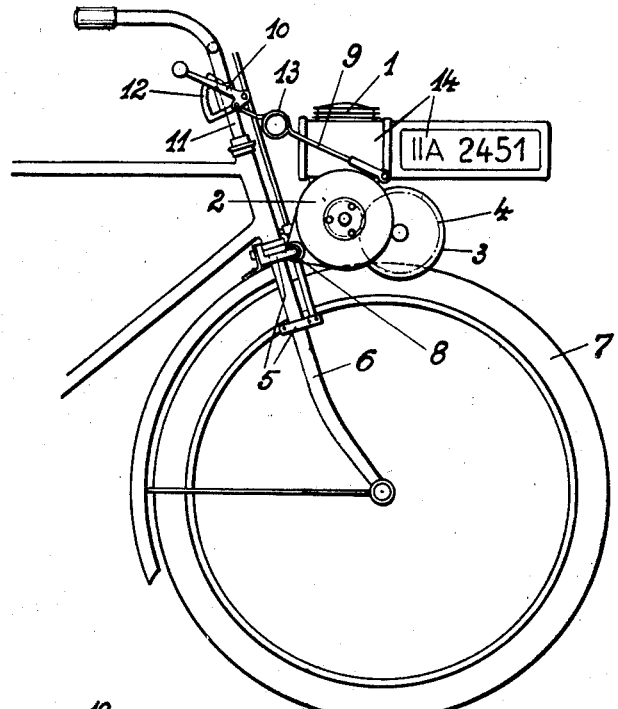
Fig. 1 shows in side elevation the front portion of a cycle with prime mover.

In Fig. 1 the prime mover comprises a single cylinder engine 1 with crank case 2 and a wedge-profiled driving wheel accommodated in a casing 3 open at the bottom, and is fixed on the fork 6 of the front wheel 7 by means of clips 5. The prime mover can be oscillated about the hinge 8 by a rod system 9 connected at one end to the prime mover and at the other end to the short arm of a two-armed lever 10. The lever 10 is oscillatably mounted on the handle bar 11 and carries a pawl cooperating with a toothed segment 12. In the example illustrated several circular coils 13 are inserted in the rod system 9 to impart a certain amount of resiliency thereto.

In the drawing the prime mover is shown lifted entirely off the front wheel 7, so that either the engine 1 is running idle or the cycle can be driven by the pedals with the engine stopped. If the cycle is to be driven by the engine, the pawl on lever 10 is disengaged from the toothed segment 12 and the prime mover lowered slowly onto the front wheel 7 by means of the lever 10 and rod system 9 until the driving wheel 4 bears against the front wheel and rotates the same by friction. The weight of the prime mover for ordinary driving is in itself sufficient to produce the necessary friction between the driving wheel 4 and the front wheel 7 of the cycle. If the engine is to be started the rider propelling the cycle by the pedals, the friction between the front wheel 7 and the driving wheel 4 is increased by exerting additional pressure with the aid of the rod system by pressing the lever 10 downwards beyond its operative position and fixing it in a corresponding tooth of segment 12. The pressure with which the apparatus bears on the front wheel is further increased by the fuel tank 14 being arranged above the driving wheel 4 and having a long narrow shape which acts with relatively great leverage relatively to the pivot 8. The arrangement of the tank 14 over the driving wheel 4 and the front wheel 7 also offers the advantage that any shocks are absorbed by the liquid fuel swirling about in the tank. Furthermore the long narrow shape is excellently suitable for carrying the registration number.

Figure 4:
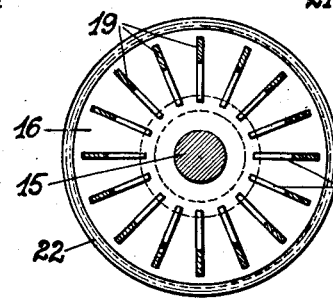
Fig. 4 is a cross-section of a wheel taken on line IV—IV of Fig. 3.

The prime mover above described is suitable for all drives with three different operative positions: idle running, normal drive and starting up. For this purpose only a driving wheel of constant diameter is required. If, however, it is desired to travel at different speeds with the same engine power, the ratio of transmission in the power transmission must be changed accordingly. This can be attained, for example, by a driving wheel such as that illustrated in Figs. 2 to 4. Two discs 16 and 17 are spliced on an axle 15 and enclosed in a cover 3. The opposite faces of the two discs 16 and 17 are conical and have radial grooves 18 in which the ends of connecting plates 19 engage. These connecting plates 19 are shorter than the grooves 18 so that they can be shifted in radial direction. A spring ring 20 surrounds the connecting plates 19. This ring tends to pull the plates as far towards the axle 15 as the mutual position of the discs 16 and 17 will allow. The connecting plates 19 bear against the front wheel tyre 21 and transmit the rotary movement of the engine thereto. The discs 16 and 17 are driven for example by toothed rims 22 and 23 meshing with two pinions on the crank shaft of the engine. The discs 16 and 17 can evidently be driven in some other way, for example by means of chains, bells or the like. Finally the two discs 16 and 17 are under the influence of springs 24 and 25 which bear against the inner side of the cover and tend to press the discs 16 and 17 together.

Figures 2, 3:
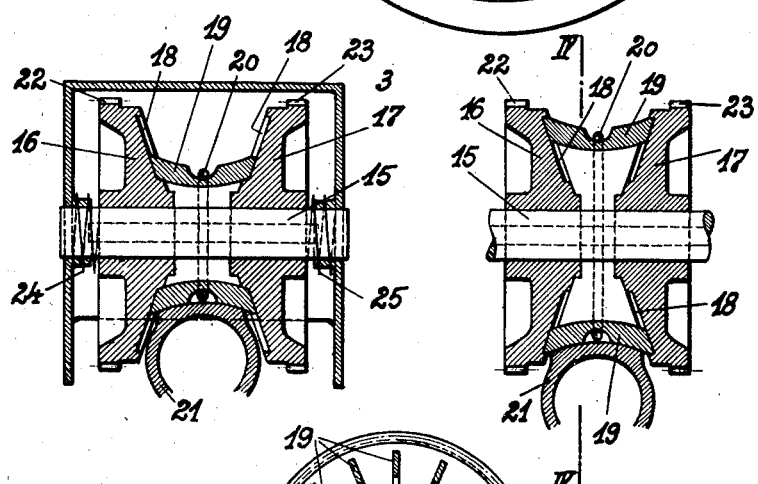
Figs. 2 and 3 are axial sections through a driving wheel with a variable rim diameter in two different positions.

The driving wheel operates in the following manner:—The more the prime mover or the driving wheel is pressed against the front wheel 7 by means of the rod system 9 and the two-armed lever 10, the more the two discs 16 and 17 will be forced apart. At the same time the spring ring 20 pulls the connecting plates 19 inwards so that the diameter of the effective bearing surface of the driving wheel, which in this instance is equal to the distance between the outer edges of two radially opposite connecting plates 19, is reduced. The ratio of transmission and the speed of rotation of the cycle wheel varies according to this diameter. If the pressure exerted by the driving wheel on the front wheel 7 is reduced, the springs 24 and 25 press together the discs 16 and 17 which force the connecting plates outwards so that the diameter of the bearing surface is increased. Fig. 2 shows the driving wheel with smallest bearing surface diameter and Fig. 3 with largest bearing surface diameter. The number of speeds at which the cycle can travel is dependent upon the number of teeth or notches provided in the toothed segment 12 on the handle bar 11. If some other suitable fixing device is chosen, the speed change can be made practically stepless.

I claim:

In a motor drive for cycles, wherein a driving wheel is adapted for peripheral driving contact with a wheel of a cycle, said driving wheel comprising an axle, a hood for the driving wheel in which the axle is journaled, springs on opposite ends of the axle within the hood, a pair of disks having opposed conical faces splined on the axle and urged to each other by said springs, a circular series of radially movable plates interposed between the conical faces of said disks to provide said peripheral driving contact and a spring surrounding said plates for normally moving the plates towards said axle distances within the limits of the tension of the springs engaged with said disks.

HERMANN MAYR.